(12) United States Patent
Suenaga

(10) Patent No.: US 9,151,601 B2
(45) Date of Patent: Oct. 6, 2015

(54) ASPHERIC FACE FORM MEASURING METHOD, FORM MEASURING PROGRAM, AND FORM MEASURING APPARATUS

(71) Applicant: CANON KABUSHIKI KAISHA, Tokyo (JP)

(72) Inventor: Kentarou Suenaga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 13/747,884

(22) Filed: Jan. 23, 2013

(65) Prior Publication Data

US 2013/0188198 A1  Jul. 25, 2013

(30) Foreign Application Priority Data

Jan. 25, 2012 (JP) ................. 2012-013168

(51) Int. Cl.
*G01B 11/24* (2006.01)
(52) U.S. Cl.
CPC ................. *G01B 11/2441* (2013.01)
(58) Field of Classification Search
CPC ............. G01B 11/2441; G01B 9/0209; G01B 9/02057; G01B 2290/70; G01B 9/02091; G01B 11/0675; G01B 11/24; G01N 21/45; G01N 2021/1787
USPC ......... 356/511–513, 497, 479, 521, 495, 496, 356/450; 702/167, 166, 155, 151; 359/370, 359/618, 629, 371
See application file for complete search history.

(56) References Cited

U.S. PATENT DOCUMENTS

| | | | | |
|---|---|---|---|---|
| 7,821,648 B2* | 10/2010 | Yamazoe et al. | ............... | 356/515 |
| 7,880,897 B2* | 2/2011 | Ge | ................. | 356/513 |
| 7,936,521 B2* | 5/2011 | Arnold et al. | ................. | 359/718 |
| 8,104,905 B2* | 1/2012 | Schillke et al. | ............... | 359/838 |
| 8,345,263 B2* | 1/2013 | Nakauchi | ....................... | 356/513 |
| 8,947,675 B2* | 2/2015 | Maeda | ........................ | 356/512 |
| 2003/0043385 A1* | 3/2003 | Kuchel | .......................... | 356/513 |
| 2005/0157311 A1* | 7/2005 | Kuchel | .......................... | 356/513 |
| 2008/0068613 A1* | 3/2008 | Kuchel | .......................... | 356/496 |
| 2009/0296101 A1* | 12/2009 | Oshima et al. | ................. | 356/512 |
| 2010/0091299 A1* | 4/2010 | Ge et al. | ......................... | 356/511 |
| 2010/0141958 A1* | 6/2010 | Hasegawa | ..................... | 356/511 |
| 2010/0177322 A1* | 7/2010 | Nakauchi | ...................... | 356/512 |
| 2011/0090510 A1* | 4/2011 | Furukawa et al. | ............ | 356/511 |
| 2011/0119011 A1* | 5/2011 | Yamazoe | ........................ | 702/85 |
| 2013/0044332 A1* | 2/2013 | Liang | ............................. | 356/512 |

FOREIGN PATENT DOCUMENTS

| | | |
|---|---|---|
| JP | 2004045168 A | 2/2004 |
| JP | 2008532010 A | 8/2008 |

* cited by examiner

*Primary Examiner* — Tarfur Chowdhury
*Assistant Examiner* — Mohamed Amara
(74) *Attorney, Agent, or Firm* — Canon USA, Inc. IP Division

(57) ABSTRACT

An aspheric face form measuring method calculates phase information of interference light from light intensity of a fringe pattern image obtained by detecting interference light that is formed by measurement light and reference light reflected off a subject aspheric face being overlaid. The method changes a relative distance between an optical system and the subject aspheric face and transitions a position of a null region. The method performs calculation of form data for a vertical incident region where measurement light is vertically incident to the subject aspheric face, using phase information and a scanning amount. The method performs calculations of form data, of the null regions, a non-vertical incident region that is outside of the vertical incident region. The method also composites a plurality of partial form data of the subject aspheric face previously calculated, using each of a plurality of the phase information and scanning amounts.

5 Claims, 8 Drawing Sheets

ASPHERIC FACE FORM MEASURING METHOD, FORM MEASURING PROGRAM, AND FORM MEASURING APPARATUS

BACKGROUND OF THE INVENTION

1. Field of the Invention

The present invention relates to aspheric face form measuring to measure a form such as an aspheric face optical element or the like, for example.

2. Description of the Related Art

Generally, an interferometer has been widely used as a form measuring apparatus to perform form measuring of work where high precision is desired, such as optical parts of a semiconductor exposure apparatus or the like. An interferometer divides a beam of light emitted from a light source into a reference light and measurement light, recombines the measurement light and reference light that have been reflected from a subject face, and by detecting the combined light here (interference light) obtains a fringe pattern image. A phase is calculated from the optical strength of the fringe pattern image, and the phase there of is converted into height information, whereby form measurement of a subject face is performed.

Now, in the event of the above-described form measuring being performed, if the obtained fringe pattern image is a single color stripe overall (one color), the image thereof can be used to perform form measuring of the entire subject face. However, in the case that the subject face is an aspheric form, a sparse portion (portion where the stripe is one color) and a dense portion will arise in the fringe pattern. In the portion of the fringe pattern that is sparse, the curvatures of the spherical face and subject face of the measurement light are roughly the same, whereby the measurement light reflects off the subject face and returns by the same optical path, and other than a optical path difference that occurs by reflecting off the subject face, little optical path difference occurs as compared to the reference light. On the other hand, in the portion where the fringe pattern is dense, the optical path difference of the measurement light and referencing light, which results from the measurement light not being vertically incident as to the subject face, is not negligible, and if the measurement error is great, performing form measurement is difficult, which is complicated by a problem with sensor resolution.

Now, as described in Japanese Patent Laid-Open No. 2004-45168, various methods such as a so-called ring stitch method have been proposed as a method to measure an aspheric form. This ring stitch method changes the relative distance between a subject aspheric face and the origination point of measurement light (e.g. a pinhole or reference sphere face), and obtains a fringe pattern image while the fringe pattern moves a sparse portion (ring null region) in the diameter direction. From the fringe pattern from the obtained fringe pattern images, phase data of the sparse portions that can be used to measure form is obtained, the multiple points of phase data are connected, and transformed into height data, thereby obtaining the form of the subject aspheric face.

Now recently, EUV (Extreme Ultraviolet) light has been proposed as a light source to be used in semiconductor exposure apparatuses, and there is demand for measurement of the form of the subject with even higher precision.

In an EUV exposure apparatus, a projection optical system is configured with aspheric mirrors throughout, and a form measuring apparatus disclosed in PCT Japanese Translation Patent Publication No. 2008-532010 (P. 33, FIG. 24) has been proposed as a measuring device that can measure a high precision aspheric optical device such as an EUV exposure apparatus mirror at a precision greater than the precision in demand (e.g. 0.1 nm RMS).

The form measuring apparatus disclosed in PCT Japanese Translation Patent Publication No. 2008-532010 (P. 33, FIG. 24) has a basic configuration of a Fizeau interferometer which causes the reference light reflected off a reference sphere and the light that transmits the reference sphere and reflects off the subject aspheric face to interfere, and obtains the fringe pattern with two charge-coupled device (CCD) cameras. According to this form measuring apparatus, unlike the above-described ring stitch method, the difference between the fringe pattern phase of the aspheric face ring portion and the fringe pattern phase of the ring null region are used to express unevenness information in the vertical direction as to the subject aspheric face. Also, the horizontal coordinates, i.e. coordinate information on a plane vertical to the aspheric face axis (center axis) of the subject aspheric face are obtained from the scanning amounts of the subject aspheric face. Approximate values of the scanning amounts of the subject aspheric face can be measured with an end-measuring machine. Further, high precision measurements based on the fringe pattern phases are realized by using the fringe pattern phases on the aspheric axis portion of the subject aspheric face and correcting the measurement values of the end-measuring machine.

The measuring method of the form measuring apparatus disclosed in PCT Japanese Translation Patent Publication No. 2008-532010 (P. 33, FIG. 24) is called a fringe pattern zone scanning method. The features thereof include measuring the phase difference and scanning amount using the fringe pattern phase of an aspheric face axis portion and the fringe pattern phase of a ring null region, and the distance information from the end-measuring machine, and finding three-dimensional form information of the subject aspheric face by solving a predetermined equation. That is to say, the form of the portion of a subject aspheric face can be directly obtained from just a pair of fringe pattern phase and end-measuring information, whereby measurement information of adjacent steps is unnecessary. Therefore, for example, accumulation of measurement error which becomes a problem in form-measuring methods such as the above-described ring stitch method does not occur, and high precision measuring can be performed.

The method in Japanese Patent Laid-Open No. 2004-45168 has various innovations so that the error does not accumulate in the Z-axis direction, but error accumulation in the horizontal coordinates is not taken into consideration. Also, the inaccuracy of using the phase data for the entire ring null region is not taken into consideration.

On the other hand, the method in PCT Japanese Translation Patent Publication No. 2008-532010 (P. 33, FIG. 24) has high measurement precision, but of the fringe pattern phases in the ring null regions, only the forms for the vertical incident region where measurement light is incident vertical to the subject face can be measured. Therefore, in the case of measuring the form of the entire face of the subject face, just a circular cross-section form can be obtained from the phase information of one step, and in order to measure the form of the entire face at sufficient data density, a large number of steps is needed, leading to a problem in that the measuring takt time becomes that much longer.

SUMMARY OF THE INVENTION

The present invention provides an aspheric face form measuring method, form measuring program, and form measuring apparatus which can measure a subject aspheric face with high precision and at a high speed.

According to an aspect of the present invention, an aspheric face form measuring method includes a phase calculating process in which a computing apparatus calculates phase information of interference light from light intensity of a fringe pattern image obtained by detecting interference light that is formed by measurement light and reference light reflected off a subject aspheric face being overlaid, wherein the measurement light and the reference light were formed by light being divided after being emitted from a light source, a scanning process in which the computing apparatus changes a relative distance between an optical system, which forms measurement light and reference light, and the subject aspheric face in an aspheric axis direction of the subject aspheric face, and transitions a position of a null region, where a fringe pattern on the fringe pattern image is a single color stripe, in the diameter direction, a first form calculating process in which the computing apparatus performs calculation of form data for a vertical incident region where, of null regions, measurement light is vertically incident to the subject aspheric face, using phase information of the vertical incident region found in the phase calculating process and a scanning amount which is the change amount of the relative distance between the optical system and the subject aspheric face, a second form calculating process in which the computing apparatus performs calculations of form data, of the null regions, a non-vertical incident region that is outside of the vertical incident region, serving as a relative form as to the vertical incident region form, and a form compositing process in which the computing apparatus composites a plurality of partial form data of the subject aspheric face calculated with the first and second form calculating process, using each of a plurality of the phase information and scanning amounts, obtained by alternately repeating the phase calculating process and scanning process.

According to another aspect of the present invention, a form measuring apparatus includes a light source, a work having a subject aspheric face, a standard lens that is disposed in an optical path between the light source and the subject aspheric face, wherein the standard lens includes a reference sphere face which reflects a portion of light emitted from the light source as reference light, with transmitted light being taken as measurement light, a moving stage that supports the work to be movable in an aspheric direction of the subject aspheric face, an imaging apparatus configured to detect interference light that is made up of measurement light reflected from the subject aspheric face and reference light, and a computing apparatus that performs calculations of form data using phase information of a vertical incident region found from a fringe pattern image and a movement amount from an initial position of the work, vertical incident regions where the measurement light is vertically incident to the subject aspheric face, of null regions where a fringe pattern in a fringe pattern image detected by the imaging apparatus is a single color stripe, and performs calculations of form data for, of the null regions, non-vertical incident regions that are outside the vertical incident regions, as a relative form as to a form of the vertical incident region.

According to the present invention, in the null regions, the form of a non-vertical incident region serving as a relative form as to a vertical incident region where measurement light is vertically incident is measured, whereby a wider range of form measurements can be performed from one fringe pattern image. Thus, the number of scanning steps that have to be made to measure the form of a subject aspheric face can be reduced, and the measuring takt time can be shortened. Also, the form of a non-vertical incident region serving as a relative form as to a vertical incident region that can be measured with high precision is measured, whereby the form of a subject aspheric face can be measured with high precision while shortening the measuring takt time.

Further features of the present invention will become apparent from the following description of exemplary embodiments with reference to the attached drawings.

DESCRIPTION OF THE EMBODIMENTS

A method to measure an aspheric face form according to an embodiment will be described below. Note that according to the present embodiment, the entire content disclosed in PCT Japanese Translation Patent Publication No. 2008-532010 (P. 33, FIG. 24) will be referenced. Also, in the description below, the term "null region" refers to a portion in a fringe pattern image where the fringe pattern is sparse, a null region that expands from the aspheric face axis portion toward the outside diameter side will be referred to as a "center null region", and a ring form null region which is formed in a concentric fashion on the outside diameter side of the aspheric face axis portion as the center null region will be referred to as a "ring null region". In this regard, provided is an aspheric face form measuring method, form measuring program, and form measuring apparatus that can measure a subject aspheric face with high precision and high speed. A fringe pattern image is obtained by detecting interference light, and calculating, of null regions in the fringe pattern image, the form of a vertical incident region wherein measurement light is vertically incident to the subject aspheric face, with high precision. The form measuring program and form measuring apparatus calculate the form of the vertical incident region as a relative form, wherein, of the null regions, the non-vertical incident region is a region outside the vertical incident region.

First Embodiment

Overall Configuration of Form Measuring Apparatus

Figure 1:
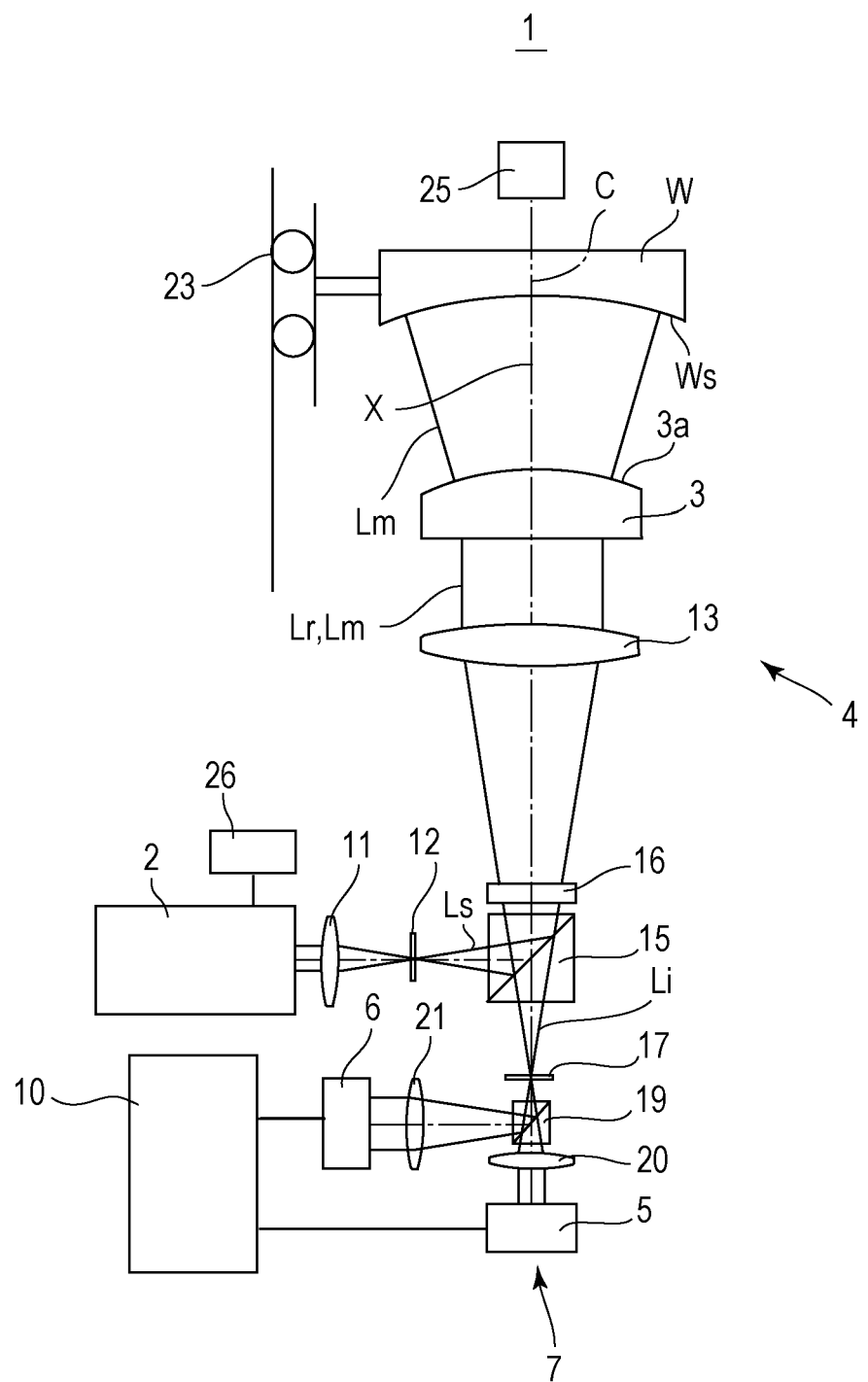
FIG. 1 is a schematic diagram of an interferometer according to an embodiment.

As illustrated in FIG. 1, a form measuring apparatus 1 is a Fizeau type of interferometer, and is configured so as to be able to measure the form of a high precision optical device (hereinafter, also referred to as "work") W, which has a subject aspheric face Ws such as a projection lens and mirror or the like of a semiconductor exposure apparatus. Specifically, the form measuring apparatus 1 has a light source 2 that emits a laser beam, a Fizeau lens (standard lens) 3 that is disposed in the optical path between the light source 2 and the subject aspheric face Ws of the work W, and an imaging apparatus 7 that is made up of first and second CCD cameras (imaging devices) 5 and 6. Also, the form measuring apparatus 1 has a display apparatus 107 that displays the light detected by the imaging apparatus 7 (see FIG. 3), and a computer 10 that analyzes an image formed on the imaging device.

Further, a lens 11, opening 12, and collimator lens 13 are disposed in the optical path between the light source 2 and Fizeau lens 3, and the light entering the Fizeau lens 3 is adjusted so as to be parallel light. Also, a polarizing beam splitter 15 and ¼ wavelength plate 16 are installed between the opening 12 and collimator lens 13, whereby the light from the light source 2 is reflected to the Fizeau lens 3, and the interference light Li is transmitted to the imaging apparatus 7. An opening 17 and beam splitter 19 are installed between the polarizing beam splitter 15 and imaging apparatus 7, and the interference light Li is divided in two by the beam splitter 19, which then are input into the first and second CCD cameras 5 and 6, respectively. Note that lenses 20 and 21 which each differ in power are installed on the front portion of the first and second CCD cameras 5 and 6, and the fringe pattern near the aspheric face axis C of the subject aspheric face Ws can be enlarged and obtained at the second CCD camera 6.

That is to say, the light Ls emitted from the light source 2 is transformed to a plane wave via the lens 11, opening 12, polarizing beam splitter 15, ¼ wave plate 16 and collimator lens 13, and enters the Fizeau lens 3. The light is then divided into a reference light Lr and measurement light Lm at a reference sphere face 3a of the Fizeau lens 3.

The reference sphere face 3a is a spherical face that has been polished with extremely high precision, the reference light Lr that reflects off this reference sphere face 3a becomes a spherical wave. On the other hand, the measurement light Lm similarly transmits the reference sphere face 3a and becomes a spherical wave. The spherical wave is reflected off the subject face Ws of the work W, thereby returning to the reference sphere face 3a along with a wave front aberration according to the shift from the spherical wave of the subject face Ws. For example, if the subject face Ws is an aspheric face form, the reflection wave front becomes aspheric. Also, of the measurement light Lm and reference light Lr formed by dividing the light Ls emitted from the light source 2, the measurement light Lm and reference light Lr reflected off the subject aspheric face Ws are overlaid on the reference sphere face 3a, whereby interference light Li is formed. The interference light Li is formed by the reference light Lr of a spherical wave and the measurement light Lm of an aspheric wave, and by transmitting the ¼ wave plate 16 twice, the polarization direction is turned 90 degrees as to the polarization direction at the time of entering the polarization beam splitter 15 from the light source 2. Thus, the light transmits the polarization beam splitter 15, and enters the first and second CCD cameras 5 and 6 via the beam splitter 19.

Between the reference sphere face 3a and subject face Ws is only air space, and the optical path of the reference light Lr and measurement light Lm is the same as before the reference sphere face 3a. Therefore, the difference between the reference sphere face 3a and subject face Ws is detected as light intensity by the first and second CCD cameras 5 and 6 that detect the interference light Li, whereby a fringe pattern image such as that shown in FIG. 2 can be obtained.

The computer 10 uses the optical path difference between the reference light Lr and measurement light Lm as form information, and analyzes the above-described fringe pattern image (interference light phase, light intensity, and reflected light position), thereby measuring the form of the subject face Ws. Therefore, if the lightness of a point of focus can be known, the form measuring apparatus 1 calculates the phase, and can further convert this into height information.

Now, for the computer 10 to analyze the fringe pattern and accurately find the phase, the width of the fringe pattern has to be at or greater than the resolution of the imaging apparatus 7. However, for the fringe pattern to be in a sparse state, the advancing direction of the reference light Lr and measurement light Lm have to be roughly parallel, but the reference light Lr is a spherical wave and the measurement light Lm reflected by the work is an aspheric wave, so this condition will not be fulfilled across the entire interference light wave.

Now, the form measuring apparatus 1 is a scanning-type interferometer whereby, in addition to the above-described configuration, the form measuring apparatus 1 maintains a work W and has a moving stage (lead) 23 that is drivable in the Z direction along the optical axis X of the measurement light Lm, and can scan the work W in the optical axis direction Z of the measurement light Lm. That is to say, the moving stage 23 serves as a driving apparatus that changes the position of the subject face Ws in the optical axis direction of the measurement light Lm. Thereby, the moving state 23 is moved in the optical axis direction under a driving command from the computer 10, and by performing form measuring at each position in the optical axis direction, the ring null region of the fringe pattern can be transitioned in the diameter direction. Also, phase data of the center and ring null region at each position is obtained, the form data of a partial subject aspheric face Ws is obtained from the phase data obtained from the computer 10, and by connecting the data the form of the overall subject face can be accurately measured.

Figure 2:
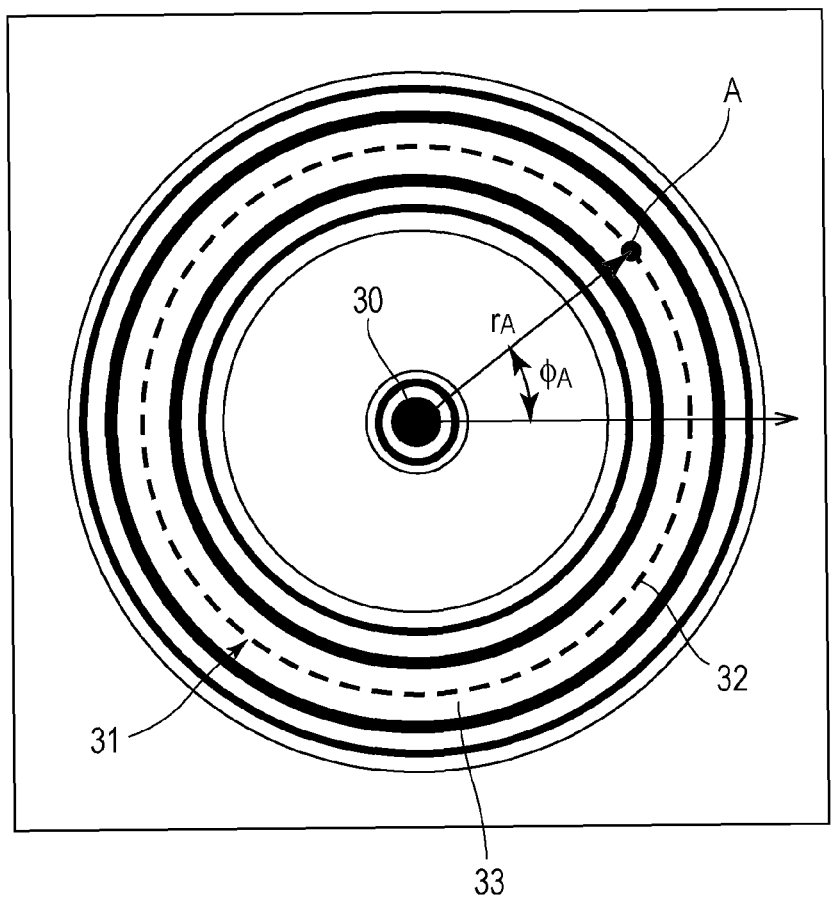
FIG. 2 is a diagram illustrating a fringe pattern image measured by the interferometer in FIG. 1.

Specifically, just the subject light that has entered vertically as to the subject aspheric face Ws reaches the first CCD camera 5, whereby as illustrated in the fringe pattern image in FIG. 2, just the region that is a portion on the subject aspheric face Ws is observed as a fringe pattern. In the case that the subject aspheric face Ws is axially symmetrical, the fringe pattern becomes sparse in a region of two locations, which are near the aspheric face axis of the subject aspheric face Ws and the ring-form region that centers around the aspheric face axis C. In the region where the fringe pattern is sparse, the fringe pattern phase can be measured as an axis vicinity phase measuring region (center null region) 30 and ring-form phase measuring region (ring-form null region) 31. However, in order measure with high precision, it is desirable for a region of a single color stripe to be the ring-form phase measuring region (ring-form null region) 31. Also, FIG. 2 illustrates a region corresponding to the measurement light that is vertically reflected off the subject aspheric face Ws with broken lines, as a vertical incident region 32.

Upon scanning the work W along the interferometer optical axis X using the moving stage 23, the region on the subject aspheric face Ws where the measurement light Lm enters vertically, moves, whereby the ring-form phase measuring region 31 and vertical incident region 32 also move. Therefore, the phases of the entire subject aspheric face Ws can be measured by appropriately scanning the work W along the interferometer optical axis X. Note that in the aspheric face axis portion of the subject aspheric face Ws, the measurement light Lm enters vertically regardless of the scanning of the work W, whereby phase measurement can be performed constantly.

Note that the movement amount of the work W (subject aspheric face Ws) is measured by an end-measuring machine 25, while a wavelength measuring machine 26 is connected to the laser light source 2, whereby the wavelength change can be constantly measured. Also, the moving state 23 has an alignment adjusting mechanism, and the work W is adjusted so as to be constantly vertical as to the optical axis (interferometer optical axis X) of the measurement light Lm.

Detailed Configuration of Computer

Figure 3:
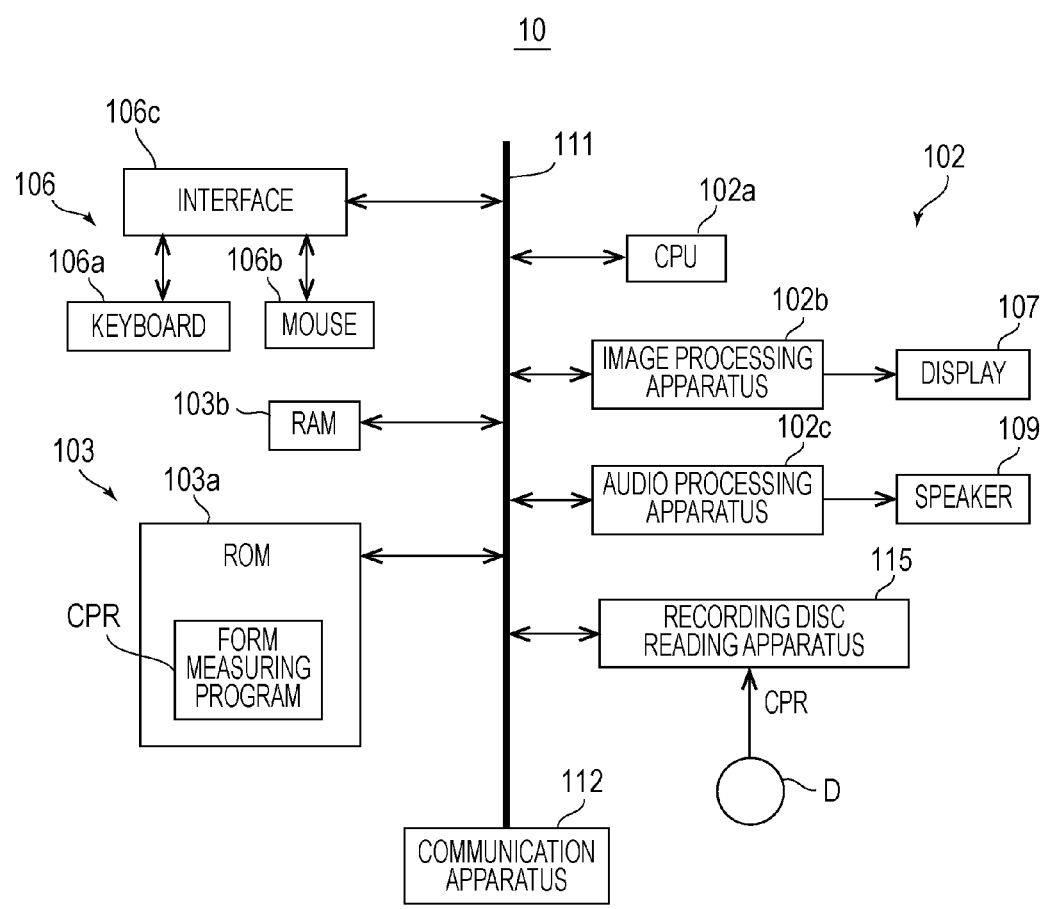
FIG. 3 is a diagram illustrating a configuration of a computer system of the interferometer in FIG. 1.

As illustrated in FIG. 3, the computer 10 is configured so that an input apparatus 106 and display apparatus 107 are connected to a computer main unit that has a computing apparatus 102 and storage apparatus 103. Various types of programs and data are stored in the storage apparatus 103, such as a form-measuring program CPR that causes the computer 10 to execute form calculations of the subject aspheric face Ws from the obtained fringe pattern image. Also, based on input operations from the input apparatus 106, the computing apparatus 102 performs computations according to the form-measuring program CPR, whereby the form of the subject aspheric face Ws can be measured.

More specifically, the computer main unit makes up a computing apparatus 102 having an image processing apparatus 102b and audio processing apparatus 102c, with a central processing unit (CPU) 102a as the main unit. In addition to the image processing apparatus 102b and audio processing apparatus 102c, a read-only memory (ROM) 103a and random-access memory (RAM) 103b are also connected to the CPU 102a via a bus 111. Programs needed for basic control of the computer are stored in the ROM 103a, and specifically a later-described form-measuring program CPR and so forth is stored therein. A work region for the CPU 102a is secured in the RAM 103b. The image processing apparatus 102b controls a liquid crystal display serving as the display apparatus 107 according to rendering instructions from the CPU 102a to display a predetermined image on the screen thereof. The audio processing apparatus 102c generates audio signals according to sound emission instructions from the CPU 102a and outputs this to a speaker 109.

A keyboard 106a and mouse 106b serving as the input apparatus 106 are connected to the CPU 102a via an input interface 106c that is connected to the bus 111, allowing input of specifying information needed for form measuring, menu selection instructions, and other instructions. Also, a recording disc reading apparatus 115 is connected to the bus 111, and reads in a recording medium D that has recorded therein the form measuring program CPR and so forth, and this can be stored in the ROM 103a for example. Note that the storage apparatus 103 is made up of a computer-readable recording medium D and other external storage devices, as well as the ROM 103a and RAM 103b which are the primary storage apparatuses.

Also, a communication apparatus 112 is connected to the bus 111, and is configured so as to allow the form measuring program CPR, which is distributed from the Internet or the like via the communication apparatus 112, to be downloaded without using a recording medium D as described above. Note that a configuration may be made wherein the computer 10 receives an input signal from the terminal device via the communication apparatus 112, and the CPU 102a computes the form measuring program CPR based on the input signals from the terminal device. That is to say, the computer 10 may be configured to function as a server device that transmits the computation results to the terminal device.

Aspheric Face Measuring Method

Figure 4:
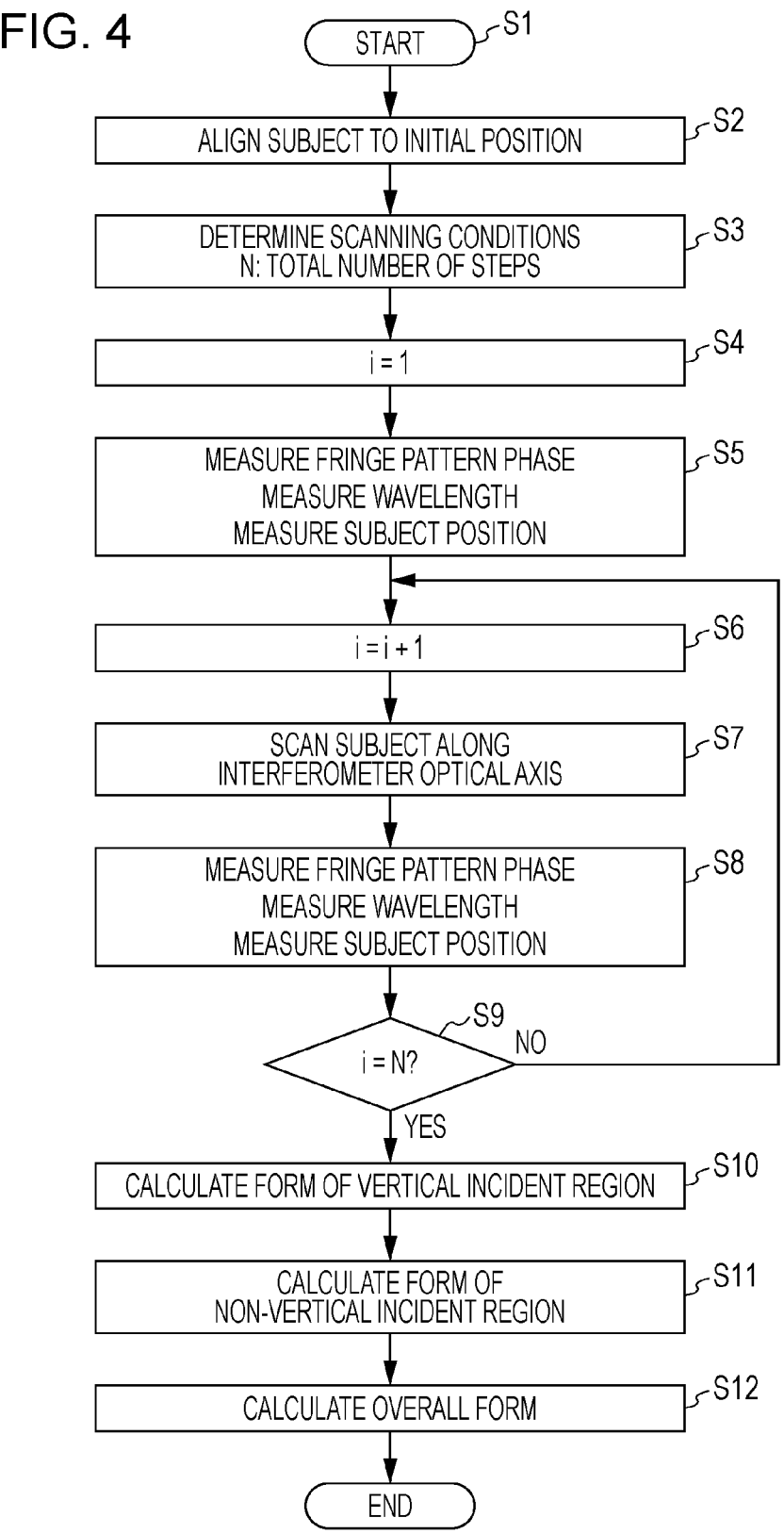
FIG. 4 is a flowchart diagram describing an aspheric face measuring method relating to a first embodiment.

Next, a method to measuring the form of the subject aspheric face Ws by the form measuring program CPR will be described based on FIG. 4. For example, in the case of measuring the form of an optical device in an aspheric form (S1), first the work W is set to the interferometer and aligned (S2). The alignment of the work W is performed so that the aspheric face axis C of the subject aspheric face Ws matches the interferometer optical axis X, and the fringe pattern near the aspheric face axis becomes a single color stripe (see FIG. 1).

Upon aligning the work W, the scanning conditions are then determined (S3). The scanning conditions mean the total number of steps N to determine how many times to measure the form of the subject aspheric face Ws, and the target movement amount of the work W in each step. The total number of steps N and the target movement amount are set so that the entire subject aspheric face Ws is covered by overlaying the ring-form phase measuring region (ring-form null region) 31 at each step.

Upon determining the scanning conditions, phase measurement of the fringe pattern image obtained by the first CCD camera 5 and second CCD camera 6, wavelength measurement of the laser light source 2 by the wavelength measuring machine 26, and position measurement in the optical axis direction of the work W by the end-measuring machine 25, are performed (S5, phase calculating process). Thereafter, movement of the work W (S7, scanning process) and fringe pattern phase measurement, wavelength measurement, and subject position measurement (S8, phase calculating process) are repeated until the total number of steps N set above has been reached (i=N, YES in S9) (S6 through S9).

That is to say, in the phase calculating processes S5 and S8, the computing apparatus 102 functions as the phase calculating unit, and phase information of the interference light is calculated from the light intensity of the fringe pattern image obtained by the computing apparatus 102 detecting the interference light Li. Also, in the scanning process of step S7, the computing apparatus 102 functions as a scanning command unit, and the computing apparatus 102 changes the relative distance between the optical system 4 that forms the measurement light Lm and reference light Lr and the subject aspheric face Ws in the aspheric face axis direction of the subject aspheric face Ws. Thus, the position of the null region where the fringe pattern formed on the outer diameter side of the aspheric face axis portion of the fringe pattern image becomes a single color stripe is transitioned in the diameter direction.

Upon the measuring of the data needed to measure the entire subject aspheric face Ws ending, the fringe pattern phase and wavelength measured in each step and the subject position information are used to calculate the form of the subject aspheric face Ws. The form calculations are largely divided into a vertical incident region form calculating process (S10, first form calculating process), non-vertical incident region form calculating process (S11, second form calculating process), and overall form calculating process (S12). Details of each flow will be described below.

First, the vertical incident region form calculating process will be described with reference to FIG. 5. Step S10 is a process to calculate the form of the vertical incident region 32 in each step, and can be performed with high precision by applying a fringe pattern zone scanning method. That is to say, the computing apparatus 102 functions as a vertical incident region form calculating unit, and the computing apparatus 102 performs calculations of vertical incident region form data from the phase information of the vertical incident region obtained in the phase calculating process and the scanning amount which is the change amount of the relative distance mentioned above.

Figure 5:
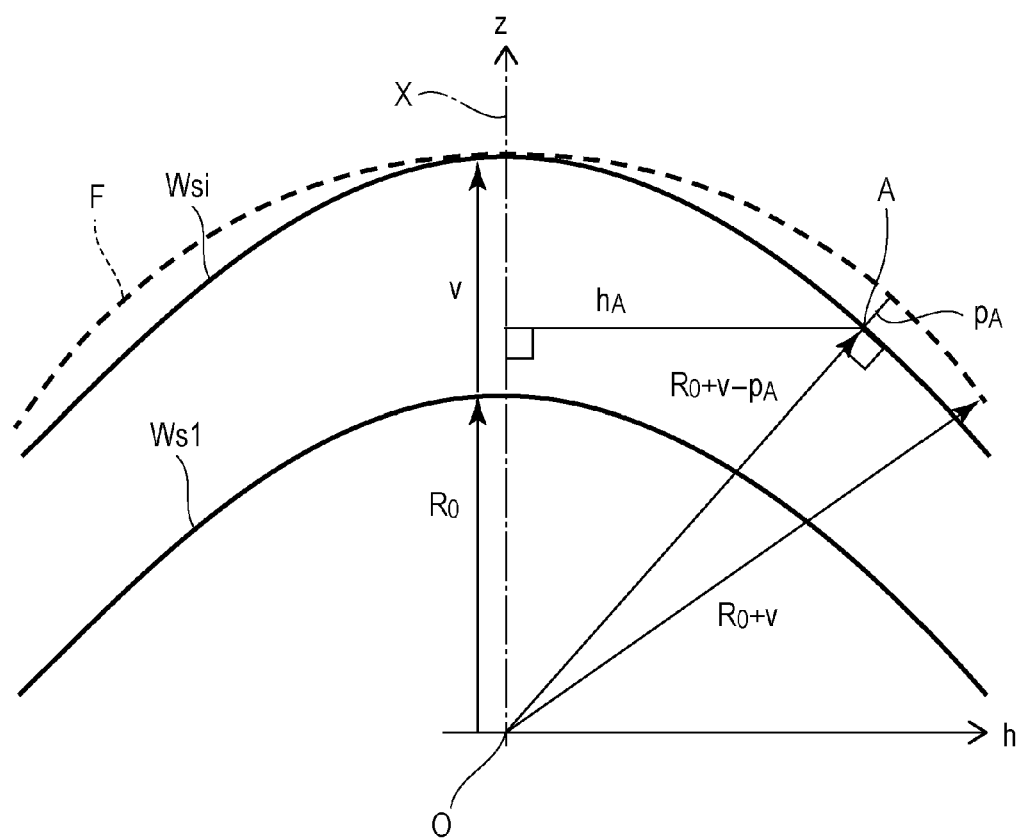
FIG. 5 is a schematic diagram describing a calculating method of the form of a vertical incident region.

FIG. 5 is a diagram illustrating the positions of the subject aspheric face Ws in the initial position after alignment and the subject aspheric face Ws in the i'th step after scanning along the interferometer optical axis X. Let us say that the curvature center O of the reference sphere face 3a is the origin, the interferometer optical axis direction is Z, and the vertical direction of the interferometer optical axis is h. Note that in FIG. 5, Ws1 denotes the subject aspheric face Ws at the initial position, Wsi denotes the subject aspheric face Ws at the i'th step, and F denotes the spherical wave (reference spherical face) of the measurement light Lm.

Alignment is performed so that the fringe pattern near the aspheric face axis is a single color strip, so the subject aspheric face Ws after alignment is disposed at a position that is separated from the curvature center O of the reference sphere face 3a by an amount equivalent to the paraxial curvature $R_0$. $R_0$ can be found by measuring the gap between the reference sphere face 3a and subject aspheric face Ws in the interferometer optical axis direction. Alternatively, the result of the entire form calculating process in step S12 may be determined to be closest to a design expression of the subject aspheric face Ws.

The subject aspheric face Ws in the i'th step moves from the initial position to a position that is separated by the scanning amount v along the interferometer optical axis X. Accordingly, the distance between the curvature center O of the reference sphere face 3a and the aspheric axis portion of the subject aspheric face Ws is $R_0+v$. The scanning amount v can be measured with the end-measuring machine 25, but by correcting the value from the end-measuring machine 25 using phase measurement results of the center (aspheric face axis portion) of the axis vicinity phase measuring region 30, precise measurements based on the fringe pattern can be obtained.

On the other hand, let us say that the point where the measurement light Lm is vertically incident in the i'th step is A. The difference between the distance from the curvature center O of the reference sphere face Ws to the aspheric face axis portion and the distance from point O to the form measuring point is denoted p and is the amount that characterizes the aspheric face form, but in step S10 the vertical incident point A is the form measuring point. Accordingly, the measurement value $p_A$ of p can be obtained by finding the difference between the phase measurement result of the center of the axis vicinity phase measuring region 30 and the phase measuring result of the vertical incident region 32.

In order to obtain the measurement value $p_A$ of p, the vertical incident region 32 has to be defined from the fringe pattern image obtained with the first CCD camera 5. The vertical incident region 21 is identified by the fringe pattern phase assuming an extremal value. That is to say, the phase value of the ring-form phase measuring region 31 is fit into Expression (1), and rotational symmetry components are included in a polynomial expression $$P(r,\phi)=P_0(r)+P_1(r)\cos\phi+P_2(r)\sin\phi \quad (1)$$

where r and $\phi$ are polar coordinate values of the first CCD camera 5, and $P_0$, $P_1$, $P_2$ are polynomials for r. By obtaining r of which $P_0$, which is a rotational symmetry component, is the extremal value, the radius of the vertical incident region 32 can be found. Note however, taking into consideration that the center of the vertical incident region 32 will shift because of the alignment error in step S10 and comatic aberration held by the subject aspheric face Ws, the fringe pattern phase value on the vertical incident region 32 is obtained while correcting the center, using P1 and P2, and the phase difference p is calculated.

However, simply obtaining the difference between the phase measurement result of the center of the axis vicinity phase measuring region 30 and the phase measurement result of the vertical incident region 32 only results in finding the numbers after the decimal point, in the case that p is a wavenumber expression. Integer portions of the wavenumber are defined by the measurement value of $R_0$ and the scanning amount v. As illustrated in FIG. 5, the distance from the point O to the vertical incident point A is expressed as $R_0+v-p_A$, whereby the approximate value of p is obtained from the distance of the line segment OA in the case that the subject aspheric face Ws is assumed to match the design expression, and the integer portion of the wavenumber is determined.

The difference between the measurement value $p_A$ of the p found as described above and the design value $p_d$ of the p found with the design expression of the subject aspheric face Ws is calculated to find the form Δn at the vertical incident point A $$\Delta n(h_A,\phi_A)=p_A(h_A,\phi_A)-p_d(h_A) \quad (2)$$

where $h_A$ is the horizontal coordinates of the vertical incident point A, i.e. the measurement value of the length of a vertical line drawn from the point A down to the interferometer optical axis X.

If we consider that the line segment OA intersects perpendicular to a tangential plane of the subject aspheric face Ws, Expression (3) holds $$R_0 + v = Z(h_A) + \frac{h_A}{Z'(h_A)} \quad (3)$$

where Z(h) is a design expression of the subject aspheric face Ws, and Z'(h) is an expression that differentiates the design expression of the subject aspheric face Ws for h. By substituting $R_0$ and v in Expression (3) and determining $h_A$ to satisfy Expression (3), the aspheric face form Δn of Expression (2) can be found.

The form of the vertical incident region is found in step S10, so if the number N of steps is increased and scanned more finely, step S10 can be executed and composited for each of the obtained fringe pattern images, whereby the overall form of the subject aspheric face Ws can be obtained. However, obtaining form data having sufficient data density requires a large number of steps, so the non-vertical incident region form calculating processing in step S11 is performed following step S10. In step S11, in the ring null region 31, the form of the ring-form phase measuring region (non-vertical incident region) 33 that is outside the vertical incident region 32 are calculated. More specifically, in this step, the computing apparatus 102 functions as the vertical incident region form calculating unit, and the computing apparatus 102 performs calculation of the form data, which serves as a relative form as to the form of the vertical incident region 32, for the non-vertical incident region 33.

Figure 6:
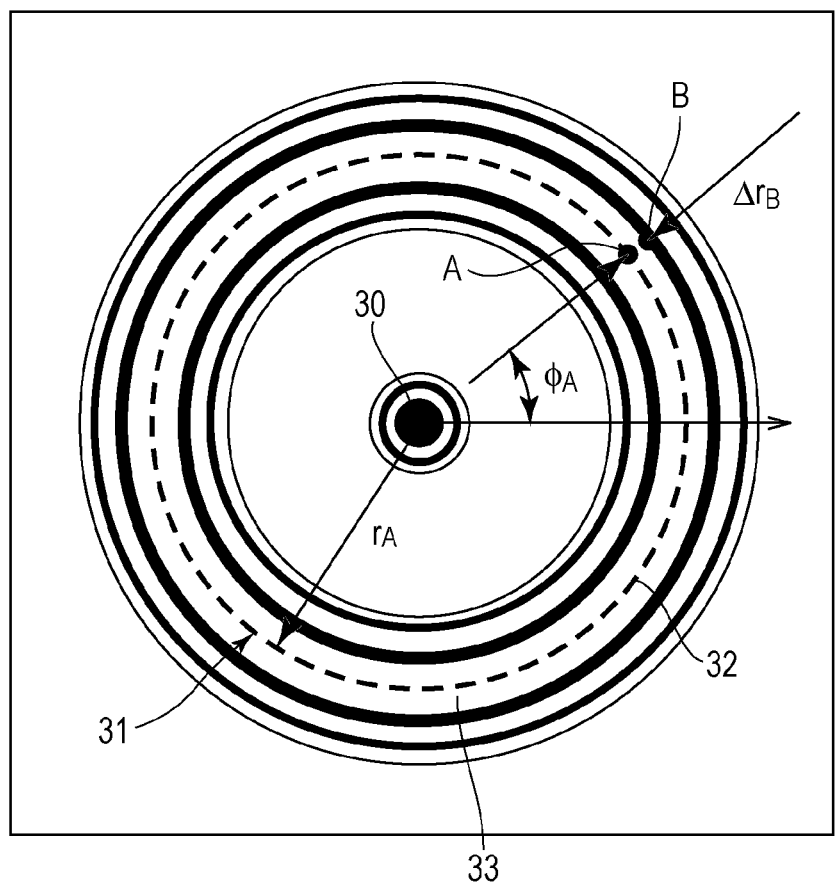
FIG. 6 is a diagram illustrating a fringe pattern image to describe a calculating method of the form of a non-vertical incident region.
Figure 7:
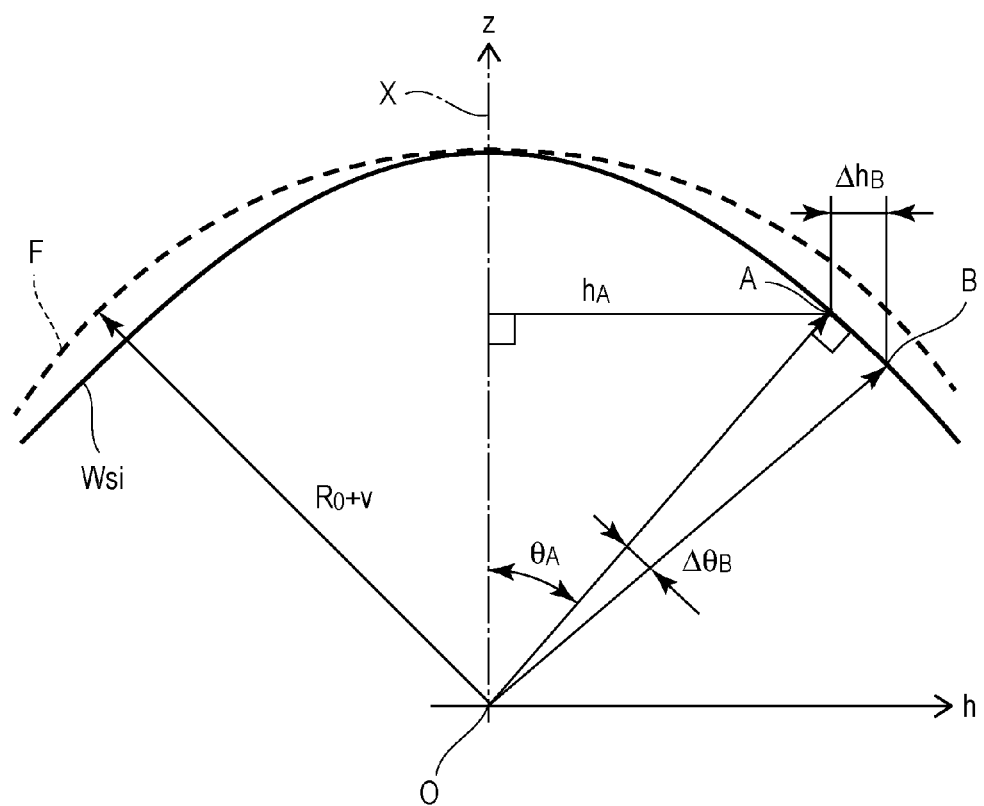
FIG. 7 is a schematic diagram describing a calculating method of the form of a non-vertical incident region.

The non-vertical incident region form calculating process in step S11 will be described below with reference to FIGS. 6 and 7. FIG. 6 illustrates a fringe pattern image obtained by the first CCD camera 5 in the i'th step. Point B in FIG. 6 is a point in the ring-form phase measuring region 31, and is a point that is outside of the vertical incident region 32 although the phase pattern is sparse and phase measurement can be performed. Also, the rotational angle $\phi$ around the aspheric axis is equal to the vertical incident point A, whereby $\phi_A=\phi_B$. The form Δn at point B is expressed, similar to Expression (2), in Expression (4)

$$\Delta n(h_B,\phi_B)=p_B(h_B,\phi_B)-p_d(h_B) \quad (4)$$

where $p_B$ is the measurement value of p at point B, and $h_B$ is the horizontal coordinates of point B, i.e. the measurement value of the length of a vertical line drawn from the point B down to the interferometer optical axis X, and if $p_B$ and $h_B$ are found, then the form Δn can be found. Finding $p_B$ and $h_B$ by using relative values where the vertical incident point A is a standard is an embodiment feature. That is to say, $p_B$ and $h_B$ are used in Expressions (5) and (6) below to find the relative values $\Delta p_B$ and $\Delta h_B$.

$$p_B(h_B,\phi_B) = p_A(h_A,\phi_A) + \Delta p_B \tag{5}$$

$$h_B = h_A + \Delta h_B \tag{6}$$

$p_B$ is calculated as the difference between the phase measurement result of the center of the axis vicinity phase measuring region 30 and the fringe pattern phase at point B, but the fringe pattern phase of the aspheric face axis portions will be the same as in the case of the vertical incident point A. Accordingly, the difference between the fringe pattern phase value at the vertical incident point A in the ring-form phase measuring region 31 and the fringe pattern phase value at point B becomes the relative value $\Delta p_B$.

On the other hand, the relative value $\Delta h_B$ of the horizontal coordinates can be obtained as relative coordinates $\Delta r_B$ of the vertical incident point A and point B in the fringe pattern image of the first CCD camera 5 illustrated in FIG. 6. However, $\Delta r_B$ is the coordinates (polar coordinates) of the first CCD camera 5, and is a value in pixel units on the CCD camera, so $\Delta r_B$ has to be converted to the horizontal coordinates on the subject aspheric face Ws.

In order to convert the CCD pixel units into horizontal coordinates on the subject aspheric face Ws, distortion information indicating the relation between the polar coordinate system which is a coordinate system on the fringe pattern image and the actual coordinate system on the subject aspheric face is used. That is to say, in FIGS. 6 and 7, the relative coordinates $\Delta r_B$ are temporarily converted to the relative value $\Delta \theta_B$ of an apex angle. Further, the relative value $\Delta h_B$ of the horizontal coordinates is found by using $\Delta \theta_B$, the apex angle $\theta_A$ of the vertical incident point A, and the design expression of the subject aspheric face Ws.

Distortion information may be calculated from optical design information of the interferometer, or may be measured separately, but it is desirable to obtain distortion information using the results in the vertical incident region form calculating process in step S10. As a result of step S10, the relation between the polar coordinates $r_A$ at the vertical incident point A on the first CCD camera 5 and the horizontal coordinates $h_A$ on the subject aspheric face Ws can be found. When using the design expression of the subject aspheric face Ws, the horizontal coordinates $h_A$ can be converted into the apex angle $\theta_A$, so the relation between the polar coordinates $r_A$ which is in CCD pixel units and the apex angle $\theta_A$, i.e., the above-described distortion information, can be found. Distortion information can be found for the vertical incident region at each step. Therefore, using distortion information for the steps to perform interpolation calculations with a spline curve or least square method, the distortion information for the entire subject aspheric face Ws can be found, and an optional point on the first CCD camera 5 can be converted into an apex angle θ.

In other words, before the non-vertical incident region form calculating process, distortion information is found for each of the form data in the found vertical incident regions. Interpolation calculations are then performed on the distortion information of the multiple vertical incident regions that have been found, and distortion information for the entire subject aspheric face is found. Using the distortion information for the entire subject aspheric face found herein and the design expression of the subject aspheric face, the difference in the polar coordinates between the vertical incident region on the fringe pattern image and the non-vertical incident region can be converted into a relative value on the horizontal coordinates.

The relative values $\Delta p_B$ and $\Delta h_B$ found as described above are substituted into Expressions (5) and (6) to find $p_B$ and $h_B$, and further $p_B$ and $h_B$ are substituted into Expression (4), and accordingly the form of the ring-form phase measuring region 31 can be calculated.

Upon calculating the forms in each step with steps S10 and S11, lastly the entire form calculating process (form compositing process) in step S12 is performed and the form information in each step composited, and the form of the entire subject aspheric face Ws is calculated. That is to say, in the entire form calculating process, the computing apparatus 102 functions as an entire form calculating unit. With this computing apparatus 102, using each of the plurality of phase information and scanning amounts obtained by repeating alternately the phase calculating process and scanning process, the plurality of partial form data of the subject aspheric face calculated with the form calculating processes are composited.

If Δn, h, and φ which are form measurement results of each step are disposed in a three-dimensional space, the form of the ensure subject aspheric face Ws can be obtained in the form of the difference from the design form. With the scanning conditions defined in step S2, there may be cases where the ring-form phase measuring region overlaps among multiple steps, but in such an event the average form of the overlapped region can be calculated and used.

By thus finding the form of the subject aspheric face Ws, the form information of the ring form can be obtained from the phase information of one step, and the number of steps needed to obtain the entire form of the subject aspheric face can be reduced. Heretofore, just the form of one cross-section can be obtained for one step, so if the forms of two cross-sections can be obtained for one step, the number of steps can be cut in half, and if the forms of three cross-sections can be obtained, the number of steps can be cut to one-third. The number of cross-sections that can be obtained from one step depends on the aspheric face amount of the subject aspheric face Ws, and the smaller the aspheric face amount, the wider the ring-form phase measuring region 31 becomes, which is beneficial.

As to the precision face, the form of the ring-form phase measuring region 31 is found with the relative coordinates using a vertical incident region found with high precision by a fringe pattern zone scanning method as a standard, accumulation of measurement error does not occur. Also, the information used to obtain the form of the ring-form phase measuring region 31 is fringe pattern phase values and distortion information, and the distortion information is found using the form calculating result of the vertical incident region 32. Therefore, the form calculating result of the non-vertical incident region 33 can also secure the precision in approximately the same amount as the vertical incident region 32. Therefore, measurement takt time can be significantly shortened while maintaining precision.

Second Embodiment

Next, a second embodiment will be described based on FIG. 8. This second embodiment differs from the first embodiment in the point of having an intra-step comparison process (form correcting process) to compare the forms of the subject aspheric face Ws obtained between steps and perform corrections, and description of points that are the same as the first embodiment will be omitted.

Figure 8:
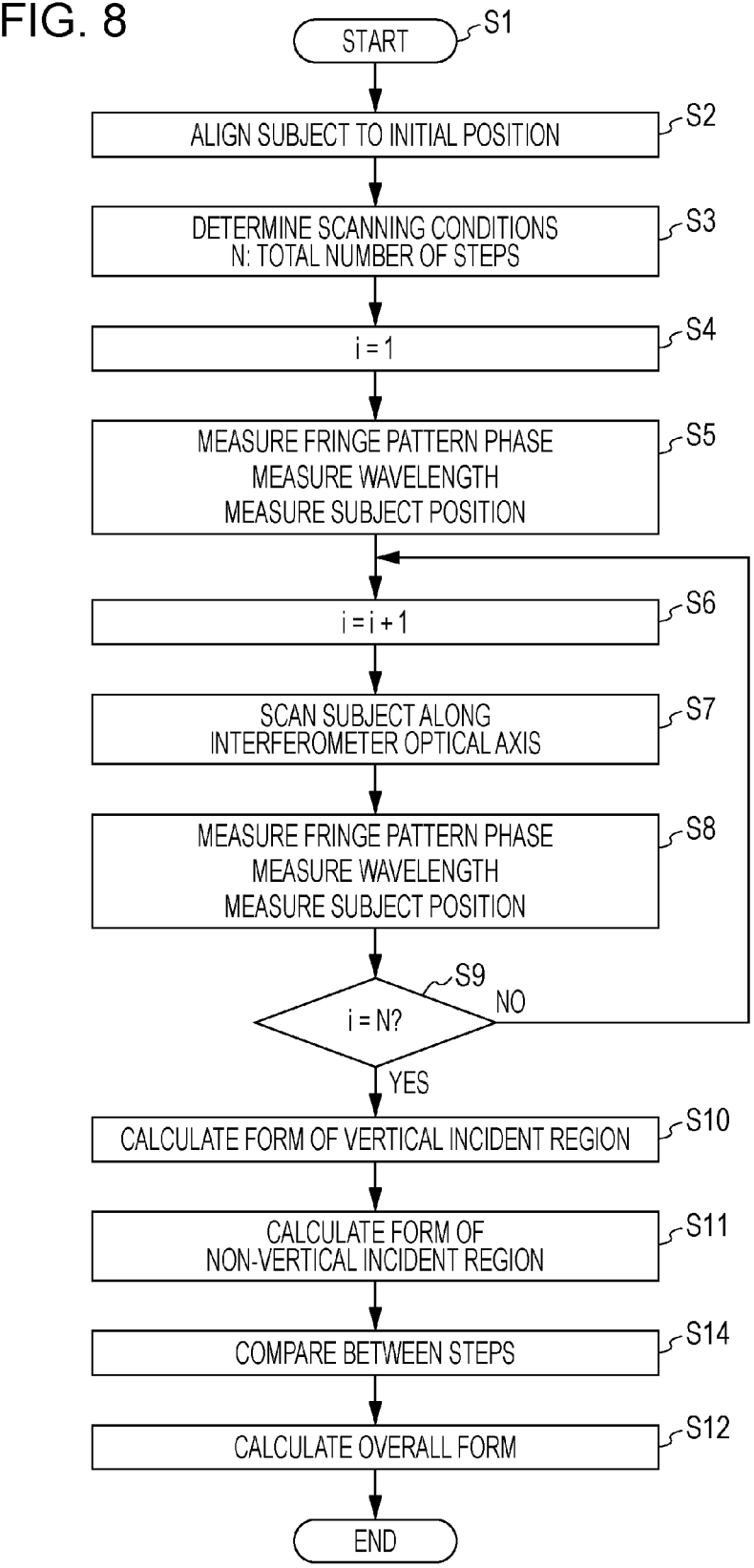
FIG. 8 is a flowchart diagram describing an aspheric face measuring method relating to a second embodiment.

As illustrated in FIG. 8, the intra-step comparison process (S14) is performed after the non-vertical incident region form calculating process (S11) and before the entire form calculating process (S12). Also, form comparison and correction are performed for any overlapping regions where the non-vertical incident regions and measuring regions of the other fringe pattern images overlap, within the multiple non-vertical incident regions where form measurement has been performed.

Specifically, for the overlap regions where the horizontal coordinates h and φ are common over multiple steps, an average form is calculated. Next, the difference forms between the forms in each step having an overlap region and the average form is calculated, and the difference forms for each step are approximated to a plane. An obtained plane approximation expression is expanded beyond the overlap regions, and a plane approximation form for the entire ring-form phase measuring region 31 is calculated, and the set as the form correction values for each step. Lastly, the form correction value is subtracted from the form of each step, whereby correction is performed so that the form of the overlap region matches the average form.

Also, in the case that multiple form correction values exist, a value that is the average of the form correction values becomes the form correction value. For example, focusing on the i'th step, in the case that two form correction values exist—the form correction value obtained from the overlap region with the adjacent i+1'th step, and the form correction value obtained from the overlap region with the i−1'th step—the average value of the two form correction values is found and set as the i'th step form correction value.

The description above is the content of the intra-step comparison process in step S14, but an aspect of the intra-step comparison process is to reduce fringe-pattern phase measurement error. The reason that measurement error is reduced by the intra-step comparison process will be described below.

With the fringe pattern zone scanning method, the aspheric face form is characterized by the difference p between the fringe pattern phase of the aspheric face axis portion and the fringe pattern phase of the ring-form phase measuring region, but this is on the backdrop of being able to reduce influence of measurement error of the fringe pattern phases by using the phase difference p. Generally, the fringe pattern phases are found with high precision with a phase shift method, but in the case that an error occurs in the phase shift amount from vibrations and stage moving error, wavelength error and the like, an error occurs in the phase measurement value. However, influence from a phase shift amount error occurs similarly in the phase of an aspheric axis portion and in a phase of the ring-form phase measuring region, so if the phase difference p is calculated the phase measurement error is cancelled out, and influence of the phase shift amount error can be reduced.

Thus, high precision measurement can be made by using the phase difference p as the measurement value, but influence in the phase shift amount error changes slightly depending on the initial phase value at the time the phase shift started. The initial phase of the aspheric axis portion and the initial phase of the ring-form phase measuring region normally differ, so there are limits to the effectiveness of canceling out phase measurement error.

The initial phases of the ring-form phase measuring regions 31 are roughly uniform values if the alignment of the work W has been correctly performed. If the alignment is off and the work W is slightly sloped or moved in parallel, a slope component is added to the initial phase distribution. Therefore, the distribution of the phase measurement error from the phase shift amount error also overlaps with the uniform component and slope component, i.e. has a planar distribution. Accordingly, by adding a planar correction value so as to match the average form of the intra-step overlap region using the intra-step comparison process in step S14, influence from phase measurement error by phase shift amount error can be reduced, and precise measurements can be performed.

Note that according to the first and second embodiments, using a moving state that supports the work W so as to be movable in the aspheric face axis direction of the subject aspheric face Ws, the relative distance between the optical system 4 having a standard lens 3 and light source 2 and the subject aspheric face Ws has been caused to change, but the optical system 4 side also may be moved.

Also, according to the present embodiment, form measurement is performed using the fringe pattern phase of the aspheric face axis portion and the fringe pattern phase of the ring null region, but form measurement may be performed by using multiple points of phase data of the ring null region, without using the fringe pattern phase of the aspheric face axis portion.

The above-described embodiments may be combined in any fashion. In an example, a computer-readable storage medium may store a program that causes a form measuring apparatus to perform a method described herein. In another example, a central processing unit (CPU) may be configured to control at least one unit or process utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-013168 filed Jan. 25, 2012, which is hereby incorporated by reference herein in its entirety.

What is claimed is:

1. An aspheric face form measuring method comprising:
    calculating, in a phase calculating process via a computing apparatus, phase information of interference light from light intensity of a fringe pattern image obtained by detecting interference light that is formed by measurement light reflected off a subject aspheric face being overlaid and reference light, wherein the measurement light and the reference light were formed by light being divided after being emitted from a light source;
    changing, in a scanning process via the computing apparatus and in an aspheric axis direction, a relative distance between an optical system, which forms measurement light and reference light, and the subject aspheric face, and transitioning, in the scanning process via the computing apparatus and in a diameter direction, a null region position of a null region where a fringe pattern on the fringe pattern image is a single color stripe;
    performing, in a first form calculating process via the computing apparatus, calculation of form data for a perpendicular incident region of null regions, where measurement light is vertically incident to the subject aspheric face, using phase information of the perpendicular incident region found in the phase calculating process and a scanning amount which is a change amount of the relative distance between the optical system and the subject aspheric face;
    performing, in a second form calculating process via the computing apparatus, calculations of form data, of the null regions, a non-perpendicular incident region that is outside of the perpendicular incident region, serving as a relative form as to a perpendicular incident region form; and compositing, in a form compositing process via the computing apparatus, a plurality of partial form data of the subject aspheric face calculated with the first and second form calculating process, using each of a plurality of the phase information and scanning amounts, obtained by alternately repeating the phase calculating process and scanning process, wherein the first form calculating process further includes finding horizontal coordinates of the perpendicular incident region while finding phase difference between a phase of the perpendicular incident region and a phase of an axis of symmetry of the aspheric surface, and calculating the form of the perpendicular incident region from the found phase difference and the scanning amount, and wherein the second form calculating process further includes finding differences between the perpendicular incident region and the non-perpendicular incident region in the phase difference between the horizontal coordinates and the phase of the aspheric face axis portion, as relative values, and calculating, using the relative values of the phase differences and horizontal coordinates, a form measurement of the non-perpendicular incident region as the relative form of the perpendicular incident region.

2. The aspheric face form measuring method according to claim 1, wherein the form data of the perpendicular incident region is calculated for each of a plurality of the fringe pattern images obtained by the first form calculating process, before the second form calculating process, and wherein, for each of the form data of the perpendicular incident region obtained by the first form calculating process, the second form calculating process includes:

finding distortion information indicating a relation between a polar coordinate system, which is a coordinate system on the fringe pattern image, and an actual coordinate system of the subject aspheric face, performing interpolation calculations on the distortion information of the plurality of perpendicular incident regions that has been found to find the distortion information over an entire subject aspheric face, and converting, using the found distortion information over the entire aspheric face and a design expression of the subject aspheric face, the difference in the polar coordinates between the perpendicular incident region on the fringe pattern image and the non-perpendicular incident region into a relative value on the horizontal coordinates.

3. The aspheric face form measuring method according to claim 1, the aspheric face form measuring method further comprising:

in a form correcting process via the computing apparatus:

finding, of the plurality of non-perpendicular incident regions in which form measuring has been performed, an average form of overlap regions where the non-perpendicular incident region in other fringe pattern images and the measuring region overlap, calculating the form difference between the form data of the overlap region and the average form, and correcting, using a form correcting value that is found from a plane-approximation expression found by approximating a difference form to a plane, the form of the perpendicular incident region and the non-perpendicular incident region of each fringe pattern image having the overlap region.

4. A non-transitory computer-readable storage medium storing a program causing a form measuring apparatus to perform the aspheric face form measuring method according to claim 1.

5. A form measuring apparatus comprising:

a light source;

a work having a subject aspheric face;

a standard lens that is disposed in an optical path between the light source and the subject aspheric face, wherein the standard lens includes a reference sphere face which reflects a portion of light emitted from the light source as reference light, with transmitted light being taken as measurement light;

a moving stage that supports the work to be movable in an aspheric direction of the subject aspheric face;

an imaging apparatus configured to detect interference light that is made up of measurement light reflected from the subject aspheric face and reference light; and a computing apparatus that performs calculations of form data using phase information of a perpendicular incident region found from a fringe pattern image and a movement amount from an initial position of the work, perpendicular incident regions where the measurement light is perpendicularly incident to the subject aspheric face, of null regions where a fringe pattern in a fringe pattern image detected by the imaging apparatus is a single color stripe, and performs calculations of form data for, of the null regions, non-perpendicular incident regions that are outside the perpendicular incident regions, as a relative form as to a form of the perpendicular incident region, wherein the computing apparatus finds horizontal coordinates of the perpendicular incident region while finding phase difference between a phase of the perpendicular incident region and a phase of an axis of symmetry of the aspheric surface, and calculates the form of the perpendicular incident region from the found phase difference and the scanning amount, and wherein the computing apparatus finds differences between the perpendicular incident region and the non-perpendicular incident region in the phase difference between the horizontal coordinates and the phase of the aspheric face axis portion, as relative values, and calculates, using the relative values of the phase differences and horizontal coordinates, a form measurement of the non-perpendicular incident region as the relative form of the perpendicular incident region.

* * * * *